Oct. 31, 1961  D. G. WILSON  3,006,213
TRANSMISSION CONTROL SYSTEM
Filed Nov. 14, 1957  2 Sheets-Sheet 2

Fig. 2

INVENTOR.
Douglas G. Wilson
BY
W. C. Middleton
ATTORNEY

United States Patent Office 3,006,213
Patented Oct. 31, 1961

3,006,213
TRANSMISSION CONTROL SYSTEM
Douglas G. Wilson, Detroit, Mich., assignor to General Motors Corporation, Detroit, Mich., a corporation of Delaware
Filed Nov. 14, 1957, Ser. No. 696,465
27 Claims. (Cl. 74—472)

This invention relates to improvements in control systems adapted for use, although not exclusively, with motor vehicle transmissions.

In transmissions of the character employing compound planetary gearing units, multiple speed ratios can be obtained by conditioning the units with appropriate ratio changing mechanisms. For one unit, these ratio changing mechanisms may be both a clutch arranged to lock up the planetary gear unit for direct drive and a brake for holding a reaction element so as to afford either an underdrive or an overdrive. The engagement and disengagement of these mechanisms for one unit, as well as between units, unless properly coordinated, will produce rough shifts from one speed ratio to another. To demonstrate assume the transmission is engine driven and that for an upshift it is necessary to disengage the mechanism for one unit while engaging the mechanism for another unit. If the one mechanism is disengaged before the other mechanism can assume the torque load, engine speed will increase too rapidly and produce an objectionable "runaway" sensation. On the other hand, if this one mechanism is engaged too soon, the engine speed will be reduced too quickly and cause an equally objectionable "jerky" feeling. Ideally, these mechanisms should be engaged and disengaged so that engine speed will decrease at some predetermined optimum rate, calculated to be relatively imperceptible to the driver.

Another problem existing, particularly when the ratio changing mechanisms are of the friction type, e.g., multi-disk clutches and brakes, is the lack of uniformity in engaging characteristics, due to wear and manufacturing tolerances, between two otherwise identical mechanisms. This aspect can be explained further with a series of like pressure actuated clutches as an example. If each clutch is designed to be engaged by a fixed pressure so as to transmit a certain torque, then due to manufacturing variations in the components, one clutch may be fully engaged and transmitting the prescribed torque while another is not. Similarly, the engaging characteristics of a well worn clutch will be different from a new one even though in each instance the applying pressure is the same. Consequently, because of these variations the calibration and coordination of shifts is diffcult.

With these considerations in mind, the invention seeks to provide a transmission control system for controlling the rate of engagement of a ratio changing mechanism so as to produce a smooth and relatively imperceptible drive ratio change. Specifically, the system contemplates varying the rate of engagement of the ratio changing mechanism according to some predetermined optimum rate. More specifically, by the invention, the rate of engagement of the ratio changing mechanism is correlated with the rate of deceleration of a prime mover.

Another aim of the invention is to combine hydraulic and electrical control systems for varying fluid pressure delivered to a ratio changing mechanism in a manner that will cause the transmission of torque to take place according to a certain scheme. Furthermore, the invention contemplates the provision of an electrically operated control device for correlating the fluid pressure engagement of the hydraulically operated mechanism according to deviations in the rate of change of prime mover speed from some selected optimum rate.

It has been found in correlating the engagement and disengagement of fluid pressure actuated ratio changing mechanisms that external forces tend to affect the calibration when an engagement is controlled from commencement to completion. In other words, it is only desirable to control engagement for an interval in between the start and finish of the engagement with control preferably beginning with torque transmission.

Accordingly, the invention contemplates a transmission control system for a fluid pressure actuated ratio changing mechanism which allows fluid pressure to build up until adequate to begin torque transmission after which the fluid pressure is so regulated that the rate of change in the speed of a prime mover follows a fixed standard. This regulation continues until engagement is substantially completed and then a maximum pressure is supplied.

According to one form of the invention, a transmission comprising two planetary gear units is combined with an electrically and hydraulically operated control system. Each of the gear units has a brake for reduced drive and a clutch for direct drive. Appropriate shift valves transfer pressure fluid to the clutches from a source when operated by a governor. The pressure fluid to one of the clutches is controlled by a pressure regulating mechanism so that the engagement of the clutch will cause the prime mover during an upshift to decelerate at an optimum rate.

The pressure regulating mechanism is controlled by an electrical part of the control system which includes a voltage generating means driven by the prime mover to develop a voltage corresponding to the speed of the prime mover. A voltage is transferred by a rate circuit to an amplifier if the prime mover speed deviates from the optimum rate. The amplifier then produces an electrical current which is transferred to the pressure regulating mechanism arranged to vary the pressure supplied to the clutch so as to maintain the decelerating speed rate of the prime mover according to the selected rate. A pressure switch is included in the system and is exposed to pressure delivered to the clutch so that as the pressure builds up to a certain point at which the clutch commences torque transmission, the pressure switch is closed and starts operation of the rate circuit. This pressure switch also actuates a transition valve which will exhaust the clutch for the other gear unit. After a predetermined interval of pressure regulation the rate circuit is rendered inoperative and pressure at some maximum is delivered to the clutch.

The foregoing and other objects and advantages of the invention will be apparent from the following description and from the accompanying drawings in which.

Figure 1:
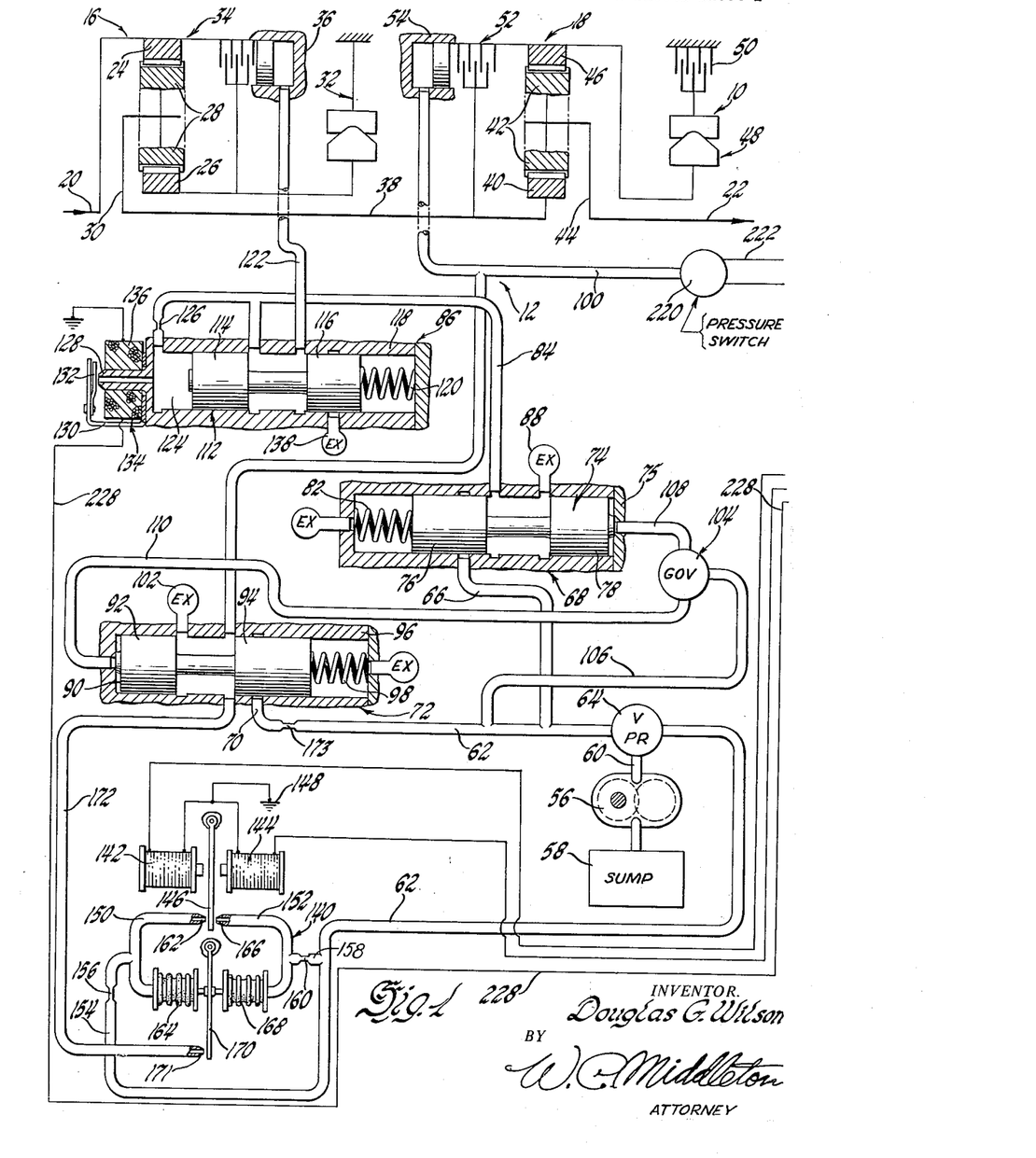
FIGURE 1 depicts schematically the left hand portion of a transmission control system constructed according to the invention.
Figure 2:
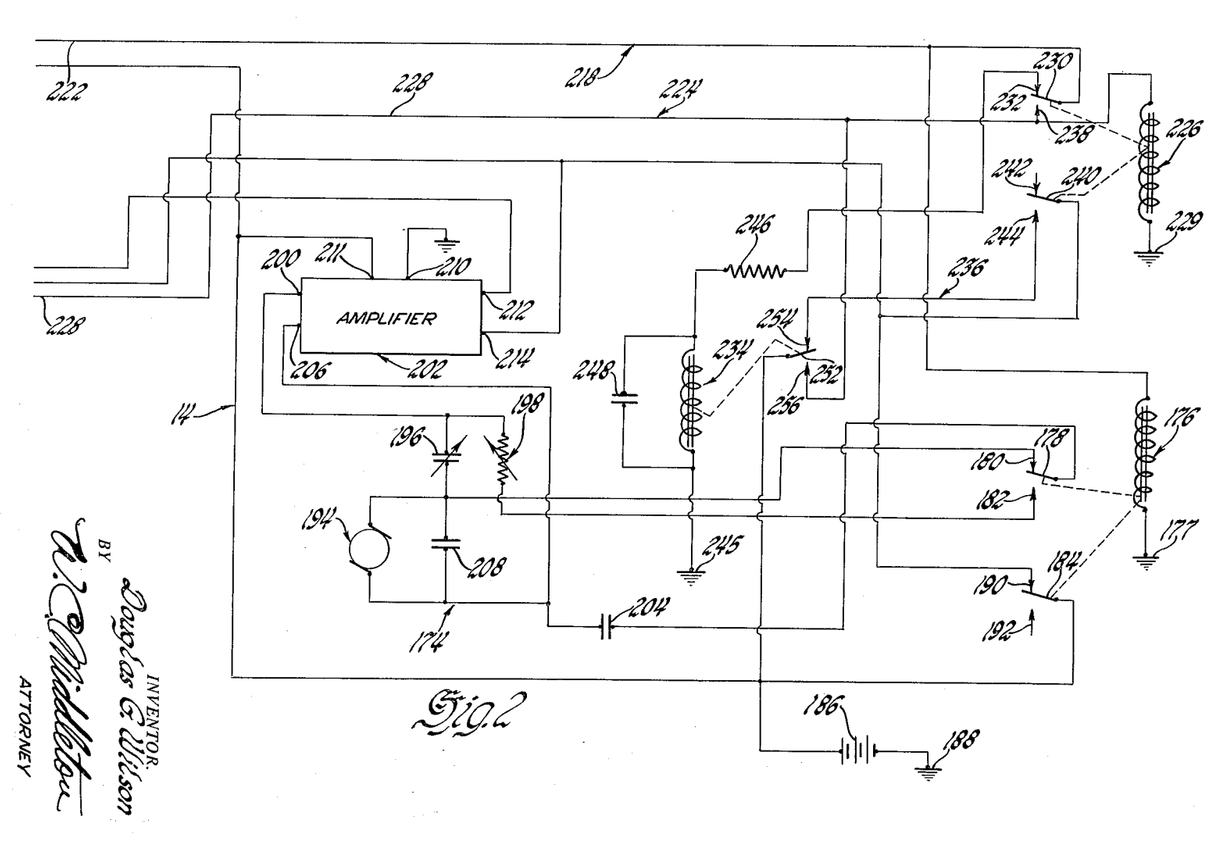
FIGURE 2 the right hand portion of the system.

Referring to the drawings, the numeral 10 designates, generally, a transmission arranged to be operated by a control system demonstrating the invention. To assist in the explanation, the control system has been divided into a hydraulic part 12 and an electrical part 14.

The transmission 10 has front and rear planetary gear units 16 and 18 interposed between an input shaft 20 and an output shaft 22. The input shaft 20 may be appropriately drive connected to a prime mover, such as the vehicle engine (not shown), and the output shaft 22 connected in a known manner to the vehicle wheels. The two gear units 16 and 18 are compounded to afford four forward speed ratios, as will be apparent.

The front planetary gear unit 16 comprises a ring gear 24 joined to the input shaft 20 and a reaction sun gear 26. Gears 24 and 26 intermesh with a series of planet pinions 28 journaled on an output planet carrier 30. For an underdrive ratio through gear unit 16, the reaction sun gear 26 is prevented from reverse rotation by a one-way mechanism 32. As a result with the ring gear 24 being driven forwardly, the planet carrier 30 will rotate forward at a reduced speed. The one-way mechanism 32 may be of any known type utilizing one-way elements such as sprags, rollers, or the like. To lock up gear unit 16 for direct drive, the ring gear 24 and sun gear 26 are clutched together by a multi-disk type clutch 34 engaged by a hydraulically actuated servo motor 36. When the clutch 34 is engaged, the planet carrier 30 will be driven forwardly at the same speed as the input ring gear 24 as will the reaction sun gear 26, since the one-way mechanism 32 is constructed to allow free forward rotation thereof.

The front unit planet carrier 30, through an intermediate shaft 38, drives an input sun gear 40 for the rear planetary gear unit 18. A series of planet pinions 42 are journaled on a planet carrier 44, drive connected to the output shaft 22, and intermesh with the sun gear 40 and a reaction ring gear 46. A one-way mechanism 48 prevents the reaction ring gear 46 from rotating backwards so that with the sun gear 40 being rotated forwardly, the planet carrier 44 will rotate at a reduced speed, also forwardly. One-way mechanism 48 is of the same type as one-way mechanism 32 for the front unit and has an outer race held by a hydraulically actuated neutral brake 50. Whenever the neutral brake 50 is disengaged, the one-way mechanism 48 becomes ineffective and drive cannot be transferred by the rear unit 18 to the output shaft 22. A multi-disk clutch 52, when engaged by a hydraulically actuated servo motor 54, interconnects the sun gear 40 and the ring gear 46 to furnish a direct drive through the rear unit 18.

The operation of the transmission 10 is as follows. The transmission 10 is conditioned for neutral with both the front and rear unit clutches 34 and 52 and the neutral brake 50 disengaged. Therefore, as mentioned, the rear unit 18 cannot transfer drive to the output shaft 22. For first speed, the neutral brake 50 is engaged whereupon both the front unit 16 and the rear unit 18 will be prepared for reduced speed drive with the ratio being determined by both units. In second speed, the front unit clutch 34 is engaged and the ratio will be determined entirely by the rear unit 18. When third speed is desired, the front unit clutch 34 is disengaged and the rear unit clutch 52 is engaged. The rear unit 18 then is locked up for direct drive and the front unit 16 is conditioned for reduced speed drive and hence determines the ratio. In fourth speed, the front unit clutch 34 is engaged and both the front and rear units 16 and 18 will provide a direct drive between the input and output shafts 20 and 22.

The hydraulic part 12 of the control system is supplied pressure fluid by a pump 56 which may be of any suitable character employing gears, vanes or the like, and may be driven either at the speed of the input shaft 20 or the output shaft 22. When the pump 56 is rotated, fluid is drawn from a sump 58 and transferred to a discharge conduit 60, in turn, connected to a main supply conduit 62. A conventional pressure regulating valve 64 is disposed in the discharge conduit 60 and operates in a known manner to establish a pressure for the system.

Fluid pressure is delivered by the supply conduit 62 through a branch conduit 66 to a front unit shift valve depicted, generally, at 68 and through another branch conduit 70 to a rear unit shift valve, as viewed at 72. Both of these shift valves have been considerably simplified so that the operation of the control system can be easily understood. The front unit shift valve 68 has a spool type valve element 74 slidable in a bore in a valve body 75 and comprises spaced lands 76 and 78. Valve element 74 is biased to the position shown by a spring 82 in which position communication is established between a transition valve supply conduit 84 to a transition valve 86 and an exhaust port 88. The rear unit shift valve 72 is of similar construction and includes a valve element 90 having spaced lands 92 and 94 and which valve element is slidable in a bore in a valve body 96. A spring 98 urges the valve element 90 to the downshifted position shown, thus establishing communication between a rear unit clutch feed conduit 100 and an exhaust port 102.

The shift valves 68 and 72 are moved from the downshifted positions depicted to the upshifted positions by a suitable hydraulic governor 104, e.g., like that disclosed by the patent to Thompson 2,204,872. Preferably, the governor 104 is driven by suitable mechanism (not shown) at the speed of the output shaft 22 so as to develop a vehicle speed conscious pressure. The governor 104 is provided with fluid pressure through a branch conduit 106 connected to the main supply conduit 62 and discharges both into a conduit 108 leading to the end of the front unit shift valve land 78 and into a conduit 110 connected to the end of the rear unit shift valve land 92. The shift valves 68 and 72 are constructed to be moved to the upshifted positions at selected speeds by the governor pressure, for instance, but without limitation, the front unit shift valve 68 at seven or eight miles per hour and the rear unit shift valve 72 at approximately 15 miles per hour.

The transition valve 86 includes a valve element 112 having spaced lands 114 and 116, the valve element 112 being slidable in a bore in a valve body 118. A spring 120 urges the valve element 112 forward to the position illustrated so that communication is established between the transition valve supply conduit 84 and a front unit clutch feed conduit 122. The supply conduit 84 also communicates with a control chamber 124 ahead of the land 114 through a restriction 126. A nozzle 128 extends from the control chamber 124 and normally opens the chamber 124 to exhaust. An arm 130 is positioned opposite the end of the nozzle 128 and has attached thereto a flexible finger 132 which functions as an armature for a transition valve relay 134. The relay 134 has a winding 136 which when energized, as will be explained, draws the flexible finger 132 into engagement with the end of the nozzle 128 interrupting fluid exhaust therefrom. When the nozzle 128 is uncovered by the finger 132, fluid pressure is drained continuously from the control chamber 124 and the transition valve 86 will remain in the position depicted. As soon as the flexible finger 132 closes the opening in the nozzle 128, pressure will build up in the control chamber 124 and shift the transition valve element 112 to the right, whereupon the front unit clutch feed conduit 122 will be opened to an exhaust port 138 and the front unit clutch 34 disengaged.

As will be noted, with the nozzle 128 uncovered, fluid pressure is constantly exhausted. However, the pump capacity is intended to be adequate to maintain the desired pressure in the conduit 84 and the size of the restriction 126 should be such as to insure maintenance of this pressure. By way of an example and without limitation, the restriction 126 may be 30 thousandths of an inch in diameter and the nozzle 128 62 thousandths of an inch.

For controlling the fluid pressure delivered to the rear unit clutch 52, a pressure regulating mechanism, such as the force motor designated, generally, at 140, is provided. The motor 140 comprises a pressure decreasing or exhaust relay 142 and a pressure increasing or fill relay 144 both of which are oppositely disposed and have therebetween a pivotally mounted armature in the form of lever 146. The relays 142 and 144 are each grounded at 148 and are energized, as will hereinafter be described. Positioned on opposite sides of the lever 146 are a pair of U-shaped conduits 150 and 152. Conduit 150 is supplied fluid pressure from the main supply conduit 62 through a branch conduit 154 and a restriction 156, while the conduit 152 is supplied through a branch conduit 158 and a restriction 160. The conduit 150 has at one end a nozzle opening at 162 and at the other end expansible bellows 164. Similarly, conduit 152 has a nozzle opening 166 at one end and expansible bellows 168 at the other. The bellows 164 and 168 are connected to a control lever 170 which is positioned adjacent to a nozzle opening 171 in a control conduit 172 extending through the rear unit shift valve 72 to the rear unit clutch feed conduit 100.

In operation, when the fill relay 144 is energized the lever 146 will close the nozzle opening 166 in the conduit 152. As a result, pressure will build up in this conduit 152 and expand bellows 168 causing the control lever 170 to close the opening 171 in the control conduit 172. With the rear unit shift valve 72 in the upshifted position, fluid pressure being supplied to the rear unit clutch servo motor 54 can increase. It should be noted at this point that a restriction 173 is provided in the conduit 70, the purpose of which is to prevent an uncontrolled rise of pressure in conduit 172 and to prevent the pressure in main supply conduit 62 from in any way being influenced by the condition of control lever 170. On the other hand, when the exhaust solenoid 142 is energized, the lever 146 is moved out of engagement with the nozzle opening 166 and into engagement with the nozzle opening 162. Pressure in the conduit 150 will build up and expand the bellows 164 so that the control lever 170 is moved out of engagement with the nozzle opening 171. The fluid pressure being supplied to the rear unit servo motor 54 will be relieved and consequently decreased. The relation of this force motor to the overall system will be described in the operational summary.

The electrical part 14 of the control system includes a rate circuit, shown generally at 174, which is controlled by a rate circuit relay 176. Relay 176 which is grounded at 177, operates both a movable contact 178 cooperating with fixed contacts 180 and 182 and another movable contact 184 coupled to a battery 186 grounded at 188. The movable contact 184 coacts with a fixed contact 190 and an open contact 192. A voltage for the rate circuit 174 is supplied by a tachometer generator 194 which is driven at the speed of the engine to develop a voltage corresponding to engine speed. The positive terminal of the tachometer generator 194 is coupled both to the fixed contact 182 through a variable capacitor 196 and a variable resistor 198 and to an input terminal 200 of an amplifier 202, while the negative terminal of the generator is connected both to the movable contact 178, through a decay capacitor 204, and to another amplifier input terminal 206. Also in the rate circuit is a capacitor 208, which is shunted across the terminals of the generator 194.

The positive terminal of the generator 194 is joined to the fixed contact 180 so that, with the movable contact 178 in the position illustrated, the variable resistor 198 will be eliminated from the rate circuit 174, hence rendering the circuit ineffective. When the rate circuit relay 176 is energized, the movable contact 178 engages the fixed contact 182 and as a result, the variable capacitor 196 and variable resistor 198 are in parallel and the rate circuit 174 becomes effective.

The amplifier 202 may be of any suitable character, such as that disclosed in the application S.N. 614,678, filed October 8, 1956. In addition to the two input terminals 200 and 206 from the rate circuit 174, there is a ground terminal 210, a battery connected terminal 211 and two output terminals 212 and 214. Output terminals 212 and 214 are connected, respectively, to the force motor exhaust and fill relays 142 and 144.

To energize the rate circuit relay 176, a starting circuit, indicated generally at 218, is utilized which comprises a pressure switch 220 having one terminal connected to the battery 186 and the other terminal coupled through a supply conductor 222 to the rate circuit relay 176. The pressure switch 220 communicates with the rear unit clutch feed conduit 100 and is calibrated to close and energize relay 176 at some predetermined pressure, e.g., 20 p.s.i., corresponding to the pressure required to engage the rear unit clutch 52 sufficiently to commence torque transmission.

The transition valve relay 134 is operated by a transition valve circuit 224 which includes a multiple function relay 226 coupled in parallel therewith through a conductor 228 and grounded at 229. Relay 226 has a movable contact 230 connected to supply conductor 222 and is movable between a fixed contact 232 coupled to a time delay relay 234 for an interrupting circuit, shown generally at 236, and fixed contact 238 connected to the transition valve circuit 224. Relay 226 also controls a contact 240 which is movable between an open contact 242 and a fixed contact 244, the latter contact 244 being in the interrupting circuit 236.

As seen, the time delay relay 234 is connected to the fixed contact 232 of relay 226 and is grounded at 245. In series with relay 234 is a resistor 246 and shunted across the terminals of relay 234 is a capacitor 248. Controlled by the relay 234 is a contact 252 movable between a fixed contact 254 connected to fixed contact 244 of multiple function relay 226 and a fixed contact 256 coupled to the conductor 228. The function and purpose of relay 234 will be discussed in the following operational summary.

In explaining the operation of the control system, assume that the transmission 10 is conditioned for second speed which occurs, as described, when the front unit clutch 34 is engaged by upshifting of the front unit shift valve 68. The decay capacitor 204 is now charged to the voltage of the tachometer generator 194. The shift to third speed will be started when the rear unit shift valve 72 is upshifted so that the rear clutch servo motor 54 is supplied with fluid pressure to commence engagement of the rear unit clutch 52. During this phase of the shift from second to third speed, since the rate circuit relay 176 is de-energized, the movable contact 184 thereof is in engagement with fixed contact 190 connecting the force motor fill relay 144 directly to the battery 186. With fill relay 144 energized, the nozzle opening 171 in control conduit 172 is closed by the control lever 170 and fluid pressure in the rear unit clutch feed conduit 100 can build up unregulated to 20 p.s.i., the pressure at which pressure switch 220 closes.

When the pressure switch 220 closes, the rate circuit relay 176 is energized through conductor 222 by the battery 186. Consequently, both of the rate circuit relay movable contacts 178 and 184 are moved downwardly to respectively engage fixed contacts 182 and 192. Since the fixed contact 192 is also an open contact, the battery 186 is no longer connected to the force motor fill relay 144 and since the movable contact 178 now engages fixed contact 182 the rate circuit 174 becomes effective to take over control of the force motor 140, as will be described.

At the same time that the rate circuit relay 176 is energized the time delay relay 234 is also energized inasmuch as the movable and fixed contacts 230 and 232 for the multiple function relay 226 are in engagement. As a result, the time delay relay contacts 252 and 256 are engaged so that battery voltage is supplied by the transition valve circuit conductor 228 both to the multiple function relay 226 and to the transition valve relay 134. Excitation of the transition relay valve 134 will cut off the exhaust of fluid pressure through the nozzle 128, and the fluid pressure in the control chamber 124 will move the transition valve 86 to the right opening the front unit clutch feed conduit 122 to exhaust port 138 disengaging the front unit clutch 34. Energization of relay 226 causes both movable contacts 230 and 240 to move downwardly into engagement, respectively, with fixed contacts 238 and 244. The contact 244 now becomes an open contact while engagement of the movable contact 230 with the contact 238 will transfer battery voltage directly to the multiple function relay 226 by way of the pressure switch 220 and maintain it energized.

Since, as mentioned, the tachometer generator 194 furnishes a voltage proportional to engine speed and since engine speed should decrease at some fixed standard rate, if the shift from second to third speed is to take place smoothly, the rate circuit 174 is calibrated to detect variations in the rate of change of voltage from this standard. If engine speed decreases properly, the signal voltage transferred to the amplifier 202 will be zero. At the instant the rate circuit 174 becomes effective, the decay capacitor 204 begins to discharge through the circuit comprised of relay contacts 178 and 182, resistor 198 and the input amplifier terminals 200 and 206. The rate of discharge of the capacitor 204 now determines the calibration of the rate circuit 174 by introducing a current into the amplifier 202 which is of opposite polarity to that from the rate capacitor 196. The effective summation of currents from the capacitors 196 and 204 into the terminals 200 and 206 determines the amplifier signal voltage. To explain further the operation of the now effective rate circuit 174 relative to the force motor 140, assume that the rear unit clutch 52 is engaging too rapidly. When this occurs, engine speed will be decreased at a faster rate than the desired standard. Since the rate circuit 174 is calibrated for the desired rate, this deviation will be detected and a representative signal voltage transferred to the amplifier 202. The amplifier 202 then causes the force motor exhaust relay 142 to be energized and the control lever 170 opens the nozzle 171 so as to relieve the pressure being supplied to the rear unit clutch 52 via feed conduit 100. Clutch engagement will be slowed and the engine speed then will increase. On the other hand, if the rear unit clutch 52 is engaging too slowly, engine speed will not decrease as fast as desired and again the rate circuit 174 will transmit a voltage to the amplifier 202 which is transferred to the force motor fill relay 144. Relay 144 becomes energized and the lever 170 will close nozzle 171 so that fluid pressure can build up and increase the rate of engagement of the rear unit clutch 52. This will cause the engine speed to decrease as a faster rate approximating the selected or standard rate. The current out of capacitor 204 will decrease exponentially with time. As a result, the rate of engine speed decrease will vary in a manner predetermined to cause a smooth engagement of the rear unit clutch 52.

After a predetermined interval, which is intended to be adequate for a complete engagement of the rear unit clutch 52, the interrupting circuit 236 becomes operative. When the multiple function relay 226 was energized, the movable contact 230 disengaged fixed contact 232 and current supply via conductor 222 to the time delay relay 234 was cut off, but due to the time delay aspect, the movable contact 252 controlled by relay 234 is not permitted to move immediately back to the normal position which is in engagement with fixed contact 254. This now takes place and battery voltage is supplied through the movable contact 252, fixed contacts 254 and 244, all in the interrupting circuit 236, to the movable contact 240 of multiple function relay 226. Inasmuch as movable contact 240 is connected to the force motor fill relay 144, battery voltage is supplied directly thereto, which, when energized, causes the control lever 170 to close the nozzle 171. Fluid pressure, now that it is no longer regulated, will build up to approximately that determined by pressure regulator valve 64. The shift to third speed is now completed.

It should be kept in mind that by having the capacitor 196 and the resistor 198 variable, the standard rate established by the rate circuit 174 can be altered to meet diverse requirements. Then the effective summation of currents from the capacitors 196 and 198 will be changed in a known way and cause a different signal voltage to be applied to the input of the amplifier 202.

Since the control system is mainly concerned with the shift from second to third speed, structure for completing the third to fourth speed shift is not shown. However, the latter shift can be accomplished in any well known manner, as by another shift valve which will be apparent to those versed in the art.

Whenever the rear unit clutch 52 is disengaged either for neutral or during a third to second speed downshift, the fluid pressure in feed conduit 100 will be exhausted by the rear unit shift valve 72, output 102 and the pressure switch 220 will re-establish the original status of the electrical part 14 of the control system.

From the foregoing, it will be seen that the control system allows fluid pressure delivered to the rear unit clutch 52 to build up until the clutch starts to transmit torque whereupon the front unit clutch 34 is disengaged and pressure supplied to the rear unit clutch 52 is regulated. The regulation causes the engagement to be such that engine speed decreases at the proper rate, and after the engagement is substantially completed, regulation is removed. Then fluid at some maximum pressure for the system is delivered to the rear unit clutch 52. In this manner factors that could influence initial and final engagement need not be considered by the regulating scheme. Since the rate of change in engine speed is the controlling agent, the desired rate is maintained regardless of clutch wear or differences from manufacturing tolerances.

The invention is to be limited only by the following claims.

I claim:

1. In a control device for a torque transmitting mechanism including driving and driven members, control means for varying the torque transmitting ability of the mechanism in accordance with deviations in the rate of speed change of one of the driving and driven members above and below a desired rate standard of change, and means responsive to the torque transmitting ability of the mechanism for initiating operation of the control means.

2. In a control device for a torque transmitting mechanism including driving and driven members, control means for varying the torque transmitting ability of the mechanism in accordance with deviations in the rate of speed change of one of the driving and driven members above and below a desired rate standard of change, means responsive to the torque transmitting ability of the mechanism for initiating operation of the control means, and means operative when the mechanism is transmitting a predetermined portion of the torque from the driving member to the driven member to interrupt operation of the control means.

3. In a pressure control device for a torque transmitting mechanism including driving and driven members, pressure operated means for rendering the mechanism operative to transmit torque between the driving and driven members, pressure regulating means for varying the pressure delivered to the pressure operating means so as to alter the torque transmitting ability of the mechanism, means sensitive to deviations in the rate of speed change of one of the driving and driven members from a desired rate for controlling the pressure regulating means, and means responsive to a predetermined pressure build up by the pressure operated means for initiating operation of the sensitive means.

4. In a pressure control device for a torque transmitting mechanism including driving and driven members, pressure operated means for rendering the mechanism operative to transmit torque between the driving and driven members, pressure regulating means for varying the pressure delivered to the pressure operating means so as to alter the torque transmitting ability of the mechanism, means sensitive to deviations in the rate of speed change of one of the driving and driven members from a desired rate for controlling the pressure regulating means, means responsive to a predetermined pressure build up by the pressure operated means for initiating operation of the sensitive means, and means operative when the mechanism is transmitting a predetermined portion of the torque from the driving member to the driven member to interrupt operation of the control means.

5. In a pressure control device for a torque transmitting mechanism including driving and driven members, pressure operated means for rendering the mechanism operative to transmit torque between the driving and driven members, pressure regulating means for varying the pressure delivered to the pressure operating means so as to alter the torque transmitting ability of the mechanism, electrical means sensitive to deviations in the rate of speed change of one of the driving and driven members from a desired rate for controlling the pressure regulating means, and means responsive to a predetermined pressure build-up by the pressure operated means for initiating operation of the electrical means.

6. In a control device for a torque transmitting mechanism including driving and driven members; the torque transmitting mechanism being engageable to transmit drive between the driving and driven members; electrical means sensitive to deviations in the rate of speed change of the mechanism driving member from a desired rate; the electrical means comprising a voltage generating means driven by the driving member for developing a voltage corresponding to the speed of the driving member, an amplifying device, and a rate circuit interposed between the voltage generating means and the amplifying device for detecting variations in the rate of change of the voltage from the desired rate and developing a representative signal voltage; pressure regulating means connected to the amplifying device for varying the pressure delivered to the pressure operated means; the pressure regulating means being controlled by the signal voltage delivered by the rate circuit to the amplifying device to coordinate the torque transmitting ability of the mechanism so as to cause the speed of the mechanism driving member to change at the desired rate; and means responsive to a predetermined pressure build-up in the pressure operating means for initiating operation of the rate circuit.

7. In a control device for a torque transmitting mechanism including driving and driven members; the torque transmitting mechanism being engageable to transmit drive between the driving and driven members; electrical means sensitive to deviations in the rate of speed change of the mechanism driving member from a desired rate; the electrical means comprising a voltage generating means driven by the driving member for developing a voltage corresponding to the speed of the driving member, an amplifying device, and a rate circuit interposed between the voltage generating means and the amplifying device for detecting variations in the rate of change of the signal voltage from the desired rate and developing a representative signal voltage; pressure regulating means connected to the amplifying device for varying the pressure delivered to the pressure operated means; the pressure regulating means being controlled by the signal voltage delivered by the rate circuit to the amplifying device to coordinate the torque transmitting ability of the mechanism so as to cause the speed of the mechanism driving member to change at the desired rate; and an interrupting circuit operative after a predetermined interval of operation of the rate circuit to stop operation of the rate circuit and cause a maximum predetermined pressure to be delivered by the pressure regulating means to the pressure operating means.

8. In a control device for a torque transmitting mechanism including driving and driven member; the torque transmitting mechanism being engageable to transmit drive between the driving and driven members; electrical means sensitive to deviations in the rate of speed change of the mechanism driving member from a desired rate; the electrical means comprising a voltage generating means driven by the driving member for developing a voltage corresponding to the speed of the driving member, an amplifying device, and a rate circuit interposed between the voltage generating means and the amplifying device for detecting variations in the rate of change of the voltage from the desired rate and developing a representative signal voltage; pressure regulating means connected to the amplifying device for varying the pressure delivered to the presure operated means; the pressure regulating means being controlled by the signal voltage delivered by the rate circuit to the amplifying device to coordinate the torque transmitting ability of the mechanism so as to cause the speed of the mechanism driving member to change at the desired rate; a starting circuit including a pressure switch responsive to a predetermined build-up of pressure in the pressure operating means; a relay energized by the pressure switch to initiate operation of the rate circuit; and an interrupting circuit including a time delay relay rendered operative after a predetermined interval of operation of the rate circuit to stop operation of the rate circuit.

9. In a pressure control device; the combination of a fluid pressure operated friction engaging mechanism including driving and driven members; the mechanism being engageable to transmit torque between the driving and driven members; a pressure regulating device for controlling the fluid pressure supplied to the friction engaging mechanism; electrical means sensitive to deviations in the rate of speed change of the mechanism driving member from a desired rate; the electrical means comprising a generator driven by the driving member for developing a voltage corresponding to the speed of the driving member, an amplifying device, and a rate circuit interposed between the generator and the amplifying device for detecting variations in the rate of change of the voltage from the desired rate and developing a representative signal voltage; the pressure regulating device being controlled by the signal voltage delivered by the rate circuit to the amplifying device to vary the pressure delivered to the friction engaging mechanism to cause the speed of the driving member to change at the desired rate; a starting circuit connected to the pressure regulating device and having a pressure switch responsive to fluid pressure delivered by the pressure regulating device to the friction engaging mechanism; a first relay normally operative to cause the pressure regulating device to allow unrestricted flow to the mechanism and to render the rate circuit inoperative; a second relay; the pressure switch being closed upon a predetermined build-up of pressure delivered to the mechanism to energize both the first relay to start operation of the rate circuit and accordingly the pressure regulating device and the second relay; and an interrupting circuit having a time delay relay energized by the second relay for stopping operation of the rate circuit after a predetermined interval of control so as to cause the pressure regulating device to supply a maximum pressure to the mechanism.

10. In a transmission driven by a prime mover, the combination of an input connected to the prime mover, an output, gearing interposed between the input, an output, hydraulically operated mechanisms for so conditioning the gearing as to establish a plurality of speed ratios therethrough, a source of fluid pressure, valve means for controlling the hydraulically operated mechanisms so as to produce a change in speed ratios through the gearing, the valve means including a shift valve for supplying pressure fluid from the source to one of the hydraulically operated mechanisms, pressure regulating means for varying the fluid pressure delivered by the shift valve to said one hydraulically operated mechanism, electrical means sensitive to deviations in the rate of speed of the prime mover from a desired rate for controlling pressure regulation by the pressure regulating means, and means responsive to a predetermined fluid pressure build-up in said one hydraulically operated mechanism for initiating operation of the electrical means.

11. In a transmission driven by a prime mover, the combination of an input connected to the prime mover, an output, gearing interposed between the input and output, hydraulically operated mechanisms for so conditioning the gearing as to establish a plurality of speed ratios therethrough, a source of fluid pressure, valve means for controlling the hydraulically operated mechanism so as to produce a change in speed ratios through the gearing, the valve means including a shift valve for supplying pressure fluid from the source to one of the hydraulically operated mechanisms, pressure regulating means for varying the fluid pressure delivered by the shift valve to said one hydraulically operated mechanism, electrical means sensitive to deviations in the rate of speed change of the prime mover from a desired rate for controlling pressure regulation by the pressure regulating means, means responsive to a predetermined fluid pressure build-up in said one hydraulically operated mechanism for initiating operation of the electrical means, and means for interrupting operation of the electrical means after a predetermined interval of control so as to cause the pressure regulating means to supply a maximum pressure to said one hydraulically operated mechanism.

12. In a transmission driven by a prime mover, the combination of an input connected to the prime mover, an output, gearing interposed between the input and output, hydraulically operated mechanisms for so conditioning the gearing as to establish a plurality of speed ratios therethrough, a source of fluid pressure, valve means for controlling the hydraulically operated mechanisms so as to produce changes in speed ratios through the gearing, the valve means including a shift valve for supplying pressure fluid from the source to one of the hydraulically operated mechanisms and a transition valve for exhausting another one of the hydraulically operated mechanisms, pressure regulating means for varying the fluid pressure delivered by the shift valve to said one hydraulically operated mechanism, electrical means sensitive to deviations in the rate of speed change of the prime mover from a desired rate both for controlling pressure regulation by the pressure regulating means and for controlling the transition valve, means responsive to a predetermined fluid pressure build-up in said one hydraulically operated mechanism for initiating operation of the electrical means and for causing the transition valve to exhaust said another hydraulically operated mechanism, and means for interrupting operation of the electrical means after a predetermined interval of control so as to cause the pressure regulating means to supply maximum pressure to said one hydraulically operated mechanism.

13. In a transmission driven by a prime mover; the combination of an input connected to the prime mover; an output; gearing interposed between the input and output; hydraulically operated mechanisms for so conditioning the gearing as to establish a plurality of speed ratios therethrough; a source of fluid pressure; valve means for controlling the hydraulically operated mechanisms so as to produce changes in speed ratios through the gearing; the valve means including a shift valve for supplying fluid pressure from the source to one of the hydraulically operated mechanisms; electrical means sensitive to deviations in the rate of speed change of the prime mover from a desired rate; the electrical means including a voltage generating means driven by the prime mover for developing a voltage corresponding to the speed of the prime mover, an amplifying device, and a rate circuit interposed between the voltage generating means and the amplifying device for detecting variations in the rate of change of the signal voltage from the desired rate and developing a representative signal voltage; a pressure regulating device connected to the amplifying device for varying the fluid pressure delivered to said one hydraulically operated mechanism; the pressure regulating device being controlled by the signal voltage delivered by the rate circuit to the amplifying device to vary the pressure delivered to said one hydraulically operated mechanism and to cause the speed of the prime mover to change at the desired rate; and pressure switch means responsive to a predetermined pressure build-up in said one hydraulically operated mechanism for initiating operation of the rate circuit.

14. In a transmission driven by a prime mover; the combination of an input connected to the prime mover; an output; gearing interposed between the input and output; hydraulically operated mechanism for so conditioning the gearing as to establish a plurality of speed ratios therethrough; a source of fluid pressure; valve means for controlling the hydraulically operated mechanisms so as to produce changes in speed ratios through the gearing; the valve means including a shift valve for supplying fluid pressure from the source to one of the hydraulically operated mechanisms; electrical means sensitive to deviations in the rate of speed change of the prime mover from a desired rate; the electrical means including a voltage generating means driven by the prime mover for developing a voltage corresponding to the speed of the prime mover, an amplifying device, and a rate circuit interposed between the voltage generating means and the amplifying device for detecting variations in the rate of change of the voltage from the desired rate and developing a representative signal voltage; a pressure regulating device connected to the amplifying device for varying the fluid pressure delivered to said one hydraulically operated mechanism; the pressure regulating device being controlled by the signal voltage delivered by the rate circuit to the amplifying device to vary the pressure delivered to said one hydraulically operated mechanism and cause the speed of the prime mover to change at the desired rate; pressure switch means responsive to a predetermined pressure build-up in said one hydraulically operated mechanism for initiating operation of the rate circuit; and an interrupting circuit for stopping operation of the rate circuit after a predetermined interval of control so as to cause the pressure regulating device to supply a maximum pressure to said one hydraulically operated mechanism.

15. In a transmission driven by a prime mover; the combination of an input connected to the prime mover; an output; gearing interposed between the input and output; hydraulically operated mechanisms for so conditioning the gearing so as to establish a plurality of speed ratios therethrough; a source of fluid pressure; valve means for controlling the hydraulically operated mechanisms so as to produce changes in speed ratios through the gearing; the valve means including a shift valve for supplying fluid pressure from the source to one of the hydraulically operated mechanisms and a transition valve for exhausting another one of the hydraulically operated mechanisms; a pressure regulating device for controlling the fluid pressure supplied to said one hydraulically operated mechanism; electrical means sensitive to deviations in the rate of speed change of the prime mover from a desired rate; the electrical means comprising voltage generating means driven by the prime mover for developing a voltage corresponding to the speed of the prime mover, an amplifying device, and a rate circuit interposed between the voltage generating means and the amplifying device for detecting variations in the rate of change of the voltage from the desired rate and developing a representative signal voltage; the pressure regulating device being controlled by the signal voltage delivered by the rate circuit to the amplifying device to vary the pressure delivered to said one hydraulically operated mechanism and to cause the speed of the prime mover to change at the desired rate; a starting circuit including a pressure switch responsive to a predetermined build-up of pressure in the hydraulically operated mechanism; a first relay normally operative to cause the pressure regulating device to allow unrestricted flow to said hydraulically operated mechanism and to render the rate circuit inoperative; and a second relay for controlling the transition valve; the pressure switch being closed upon a predetermined build-up of pressure delivered to said hydraulically operated mechanism to energize both the first relay to start operation of the rate circuit and accordingly the pressure regulating device and the second relay to cause the transition valve to exhaust said another hydraulically operated mechanism.

16. In a transmission driven by a prime mover; the combination of an input connected to the prime mover; an output; gearing interposed between the input and output; hydraulically operated mechanism for so conditioning the gearing so as to establish a plurality of speed ratios therethrough; a source of fluid pressure; valve means for controlling the hydraulically operated mechanisms so as to produce changes in speed ratios through the gearing; the valve means including a shift valve for supplying fluid pressure from the source to one of the hydraulically operated mechanisms and a transition valve for exhausting another one of the hydraulically operated mechanisms; a pressure regulating device for controlling the fluid pressure supplied to said one hydraulically operated mechanism; electrical means sensitive to deviations in the rate of speed change of the prime mover from a desired rate; the electrical means comprising a voltage generating means driven by the prime mover for developing a voltage corresponding to the speed of the prime mover, an amplifying device, and a rate circuit interposed between the voltage generating means and the amplifying device for detecting variations in the rate of change of the voltage from the desired rate and developing a representative signal voltage; the pressure regulating device being controlled by the signal voltage delivered by the rate circuit to the amplifying device to vary the pressure delivered to said one hydraulically operated mechanism and to cause the speed of the prime mover to change at the desired rate; a starting circuit including a pressure switch responsive to a predetermined build-up of pressure in the hydraulically operated mechanism; a first relay normally operative to cause the pressure regulating device to allow unrestricted flow to said hydraulically operated mechanism and to render the rate circuit inoperative; a second relay for controlling the transition valve; the pressure switch being closed upon a predetermined build-up of pressure delivered to said hydraulically operated mechanism to energize both the first relay to start operation of the rate circuit and accordingly the pressure regulating device and the second relay to cause the transition valve to exhaust said another hydraulically operated mechanism; and an interrupting circuit having a time delay relay energized by the second relay for stopping operation of the rate circuit after a predetermined interval of control so as to cause the pressure regulating device to supply a maximum pressure to said one hydraulically operated mechanism.

17. In a control device for a torque transmitting mechanism including driving and driven members, control means for varying the torque transmitting ability of the mechanism in accordance with deviations in the rate of speed change of one of the driving and driven members above and below a desired rate of standard of change, and means for varying the desired rate standard of change.

18. In a control device for a torque transmitting mechanism including driving and driven members, control means for varying the torque transmitting ability of the mechanism in accordance with deviations in the rate of speed change of one of the driving and driven members above and below a desired rate standard of change, and means for varying the desired rate standard of change exponentially with time.

19. In a pressure control device for a torque transmitting mechanism including driving and driven members, pressure operated means for rendering the mechanism operative to transmit torque between the driving and driven members, pressure regulating means for varying the pressure delivered to the pressure operating means so as to alter the torque transmitting ability of the mechanism, means sensitive to deviations in the rate of speed change of one of the driving and driven members above and below a desired rate and rendered operative when the mechanism has a predetermined torque transmitting ability for controlling the pressure regulating means, and means for varying the desired rate.

20. In a pressure control device for a torque transmitting mechanism including driving and driven members, pressure operated means for rendering the mechanism operative to transmit torque between the driving and driven members, pressure regulating means for varying the pressure delivered to the pressure operating means so as to alter the torque transmitting ability of the mechanism, means sensitive to deviations in the rate of speed change of one of the driving and driven members from a desired rate for controlling the pressure regulating means, means for varying the desired rate, means responsive to a pretermined pressure build up by the pressure operated means for initiating operation of the sensitive means, and means operative when the mechanism is transmitting a predetermined portion of the torque from the driving member to the driven member to interrupt operation of the control means.

21. In a control device for a torque transmitting mechanism including driving and driven members; the torque transmitting mechanism being engageable to transmit drive between the driving and driven members; electrical means sensitive to deviations in the rate of speed change of the mechanism driving member from a desired rate; the electrical means comprising a voltage generating means driven by the driving member for developing a voltage corresponding to the speed of the driving member, an amplifying device, and a rate circuit interposed between the voltage generating means and the amplifying device for detecting variations in the rate of change of the voltage from the desired rate and developing a representative signal voltage; the rate circuit including means for varying the desired rate; and pressure regulating means connected to the amplifying device for varying the pressure delivered to the pressure operated means; the pressure regulating means being controlled by the signal voltage delivered by the rate circuit to the amplifying device to coordinate the torque transmitting ability of the mechanism so as to cause the speed of the mechanism driving member to change at the desired rate.

22. In a control device for a torque transmitting mechanism including driving and driven members; the torque transmitting mechanism being engageable to transmit drive between the driving and driven members; electrical means sensitive to deviations in the rate of speed change of the mechanism driving member from a desired rate; the electrical means comprising a voltage generating means driven by the driving member for developing a voltage corresponding to the speed of the driving member, an amplifying device, and a rate circuit interposed between the voltage generating means and the amplifying device for detecting variations in the rate of change of the voltage from the desired rate and developing a representative signal voltage; the rate circuit including means for varying the desired rate; pressure regulating means connected to the amplifying device for varying the pressure delivered to the pressure operated means; the pressure regulating means being controlled by the signal voltage delivered by the rate circuit to the amplifying device to coordinate the torque transmitting ability of the mechanism so as to cause the speed of the mechanism driving member to change at the desired rate; a starting circuit including a pressure switch responsive to a predetermined build-up of pressure in the pressure operating means; a relay energized by the pressure switch to initiate operation of the rate circuit; and an interrupting circuit including a time delay relay rendered operative after a predetermined interval of operation of the rate circuit to stop operation of the rate circuit.

23. In a pressure control device; the combination of a fluid pressure operated friction engaging mechanism including driving and driven members; the mechanism being engageable to transmit torque between the driving and driven members; a pressure regulating device for controlling the fluid pressure supplied to the friction engaging mechanism; electrical means sensitive to deviations in the rate of speed change of the mechanism driving member from a desired rate; the electrical means comprising a generator driven by the driving member for developing a voltage corresponding to the speed of the driving member, an amplifying device, and a rate circuit interposed between the generator and the amplifying device for detecting variations in the rate of change of the voltage from the desired rate and developing a representative signal voltage; the rate circuit including means for varying the desired rate exponentially with time; the pressure regulating device being controlled by the signal voltage delivered by the rate circuit to the amplifying device to vary the pressure delivered to the friction engaging mechanism to cause the speed of the driving member to change at the desired rate; a starting circuit connected to the pressure regulating device and having a pressure switch responsive to fluid pressure delivered by the pressure regulating device to the friction engaging mechanism; a first relay normally operative to cause the pressure regulating device to allow unrestricted flow to the mechanism and to render the rate circuit inoperative; a second relay; the pressure switch being closed upon a predetermined build-up of pressure delivered to the mechanism to energize both the first relay to start operation of the rate circuit and accordingly the pressure regulating device and the second relay; and an interrupting circuit having a time delay relay energized by the second relay for stopping operation of the rate circuit after a predetermined interval of control so as to cause the pressure regulating device to supply a maximum pressure to the mechanism.

24. In a transmission driven by a prime mover, the combination of an input connected to the prime mover, an output, gearing interposed between the input, and output, fluid pressure operated mechanisms for so conditioning the gearing as to establish a plurality of speed ratios therethrough, a source of fluid pressure, valve means for controlling the fluid pressure operated mechanisms to produce a change in speed ratios through the gearing, the valve means including a shift valve for supplying pressure fluid from the source to one of the fluid pressure operated mechanisms, pressure regulating means for varying the fluid pressure delivered by the shift valve to said one fluid pressure operated mechanism, electrical means sensitive to deviations in the rate of speed of the prime mover from a desired rate standard for controlling pressure regulation by the pressure regulating means, and means for varying the desired rate standard.

25. In a transmission driven by a prime mover, the combination of an input connected to the prime mover, an output, gearing interposed between the input and output, hydraulically operated mechanisms for so conditioning the gearing as to establish a plurality of speed ratios therethrough, a source of fluid pressure, valve means for so controlling the hydraulically operated mechanisms as to produce changes in speed ratios through the gearing, the valve means including a shift valve for supplying pressure fluid from the source to one of the hydraulically operated mechanisms and a transition valve for exhausting another one of the hydraulically operated mechanisms, pressure regulating means for varying the fluid pressure delivered by the shift valve to said one hydraulically operated mechanism, electrical means sensitive to deviations in the rate of speed change of the prime mover from a desired rate both for controlling pressure regulation by the pressure regulating means and for controlling the transition valve, the electrical means including means for varying the desired rate, means responsive to a predetermined fluid pressure build-up in said one hydraulically operated mechanism for initiating operation of the electrical means and for causing the transition valve to exhaust said another hydraulically operated mechanism, and means for interrupting operation of the electrical means after a predetermined interval of control so as to cause the pressure regulating means to supply maximum pressure to said one hydraulically operated mechanism.

26. In a transmission driven by a prime mover; the combination of an input connected to the prime mover; an output; gearing interposed between the input and output; hydraulically operated mechanisms for so conditioning the gearing so as to establish a plurality of speed ratios therethrough; a source of fluid pressure; valve means for controlling the hydraulically operated mechanism so as to produce changes in speed ratios through the gearing; the valve means including a shift valve for supplying fluid pressure from the source to one of the hydraulically operated mechanisms and a transition valve for exhausting another one of the hydraulically operated mechanisms; a pressure regulating device for controlling the fluid pressure supplied to said one hydraulically operated mechanism; electrical means sensitive to deviations in the rate of speed change of the prime mover from a desired rate; the electrical means comprising voltage generating means driven by the prime mover for developing a voltage corresponding to the speed of the prime mover, an amplifying device, and a rate circuit interposed between the voltage generating means and the amplifying device for detecting variations in the rate of change of the voltage from the desired rate and developing a representative signal voltage; the pressure regulating device being controlled by the signal voltage delivered by the rate circuit to the amplifying device to vary the pressure delivered to said one hydraulically operated mechanism and to cause the speed of the prime mover to change at the desired rate; the rate circuit including a capacitor for varying the desired rate exponentially with time; a starting circuit including a pressure switch responsive to a predetermined build-up of pressure in the hydraulically operated mechanism; a first relay normally operative to cause the pressure regulating device to allow unrestricted flow to said hydraulically operated mechanism and to render the rate circuit inoperative; and a second relay for controlling the transition valve; the pressure switch being closed upon a predetermined build-up of pressure delivered to said hydraulically operated mechanism to energize both the first relay to start operation of the rate circuit and accordingly the pressure regulating device and the second relay to cause the transition valve to exhaust said another hydraulically operated mechanism.

27. In a transmission driven by a prime mover, the combination of an input connected to the prime mover, an output, gearing interposed between the input and output, hydraulically operated mechanisms for so conditioning the gearing as to establish a plurality of speed ratios therethrough, a source of fluid pressure, valve means for controlling the hydraulically operated mechanism so as to produce a change in speed ratios through the gearing, the valve means including a shift valve for supplying pressure fluid from the source to one of the hydraulically operated mechanisms, means for controlling the increase of fluid pressure to said one of the hydraulically operated mechanisms, pressure regulating means for varying the fluid pressure delivered by the shift valve to said one hydraulically operated mechanism, electrical means sensitive to deviations in the rate of speed change of the prime mover from a desired rate for controlling pressure regulation by the pressure regulating means, means responsive to a predetermined fluid pressure build-up in said one hydraulically operated mechanism for initiating operation of the electrical means, and means for interrupting operation of the electrical means after a predetermined interval of control so as to cause the pressure regulating means to supply a maximum pressure to said one hydraulically operated mechanism.

References Cited in the file of this patent

UNITED STATES PATENTS

| | | |
|---|---|---|
| 2,035,047 | Cotter | Mar. 24, 1936 |
| 2,164,865 | Keiper | July 4, 1939 |
| 2,539,649 | Winther | Jan. 30, 1951 |
| 2,720,120 | Orr et al. | Oct. 11, 1955 |
| 2,711,656 | Smiral | June 28, 1955 |
| 2,765,893 | Stuart | Oct. 9, 1956 |